US012606108B2

(12) United States Patent
Okado et al.

(10) Patent No.: US 12,606,108 B2
(45) Date of Patent: Apr. 21, 2026

(54) CONTROL DEVICE, MOVING OBJECT, AND CONTROL METHOD

(71) Applicant: HONDA MOTOR CO., LTD., Tokyo (JP)

(72) Inventors: Michihito Okado, Wako (JP); Victor Alcahud Guim, Wako (JP); Takao Kanki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 155 days.

(21) Appl. No.: 18/430,725

(22) Filed: Feb. 2, 2024

(65) Prior Publication Data

US 2024/0262305 A1 Aug. 8, 2024

(30) Foreign Application Priority Data

Feb. 6, 2023 (JP) ................................. 2023-015823

(51) Int. Cl.
B60R 16/037 (2006.01)
B60N 2/90 (2018.01)
G06V 20/59 (2022.01)

(52) U.S. Cl.
CPC .............. B60R 16/037 (2013.01); B60N 2/91 (2018.02); G06V 20/593 (2022.01)

(58) Field of Classification Search
CPC ....... B60R 16/037; B60N 2/91; G06V 20/593
USPC ........................................................ 701/49
See application file for complete search history.

(56) References Cited

U.S. PATENT DOCUMENTS

| | | | | | |
|---|---|---|---|---|---|
| 2011/0227391 | A1* | 9/2011 | Cahall | ...................... | B60N 2/91 |
| | | | | | 297/464 |
| 2019/0008121 | A1* | 1/2019 | Khanna | ................ | G06V 20/593 |
| 2020/0262562 | A1* | 8/2020 | Dowty | ............... | B64D 11/0606 |
| 2020/0377041 | A1* | 12/2020 | Sekizuka | ............ | B60R 21/06 |
| 2020/0384940 | A1* | 12/2020 | Sekizuka | ............ | B60R 21/0132 |
| 2021/0380254 | A1* | 12/2021 | Woodington | ...... | B64D 11/0606 |
| 2022/0024353 | A1* | 1/2022 | Cha | .................... | B60H 1/00564 |
| 2022/0063520 | A1* | 3/2022 | Ohno | .................. | B60R 13/0823 |
| 2022/0185214 | A1* | 6/2022 | Tiwari | ................... | B60R 21/01 |
| 2022/0242572 | A1 | 8/2022 | Layet et al. | | |
| 2023/0305578 | A1* | 9/2023 | Melin | .................. | B60N 2/0276 |
| 2023/0331388 | A1* | 10/2023 | Stewart | .................. | B60N 3/026 |
| 2023/0348064 | A1* | 11/2023 | Chavarria Garcia | ........................ | |
| | | | | | B64D 11/0606 |
| 2024/0246504 | A1* | 7/2024 | Aller | ..................... | B60R 21/026 |

FOREIGN PATENT DOCUMENTS

| | | |
|---|---|---|
| EP | 3 981 664 A1 | 4/2022 |
| JP | 2022-042324 A | 3/2022 |

\* cited by examiner

*Primary Examiner* — Krishnan Ramesh
(74) *Attorney, Agent, or Firm* — Rankin, Hill & Clark LLP

(57) ABSTRACT

A control device controls a partition of a moving object including a first seat provided in the moving object, a second seat provided in the moving object, and the partition positioned between the first seat and the second seat and which is projectable. The control device includes a moving state determination unit that determines whether or not the moving object has transitioned to a predetermined moving state, and a partition control unit that automatically project the partition when the moving state determination unit determines that the moving object has transitioned to the predetermined moving state.

12 Claims, 5 Drawing Sheets

CONTROL DEVICE, MOVING OBJECT, AND CONTROL METHOD

CROSS-REFERENCE TO RELATED APPLICATIONS

This application is based upon and claims the benefit of priority from Japanese Patent Application No. 2023-015823 filed on Feb. 6, 2023, the contents of which are incorporated herein by reference.

BACKGROUND OF THE INVENTION

Field of the Invention

The present invention relates to a control device, a moving object, and a control method.

Description of the Related Art

JP 2022-042324 A discloses a partition setting permission device provided in an autonomous vehicle. The partition setting permission device does not permit a visual partition to be provided around the driver when the vehicle is being manually driven. Thus, the driver's view is prevented from being blocked by the partition.

SUMMARY OF THE INVENTION

JP 2022-042324 A does not refer to a method of controlling a partition that shields between passengers who are not drivers. There is a demand for a technique for suitably controlling a partition for shielding between passengers.

An object of the present invention is to solve the above-mentioned problem.

A first aspect of the present invention is a control device for controlling a partition of a moving object, the moving object including: a first seat provided in the moving object; a second seat provided in the moving object; and the partition which is positioned between the first seat and the second seat and is projectable, the control device including: a moving state determination unit configured to determine whether or not the moving object has transitioned to a predetermined moving state; and a partition control unit configured to automatically project the partition when the moving state determination unit determines that the moving object has transitioned to the predetermined moving state.

A second aspect of the present invention is a control device for controlling a partition of a moving object, the moving object including: a first seat provided in the moving object; a second seat provided in the moving object; and the partition which is positioned between the first seat and the second seat and is openable and closable, the control device including: a relationship grasping unit configured to grasp a relationship between a first passenger seated on the first seat and a second passenger seated on the second seat; and a partition control unit configured to automatically control the partition, based on the relationship grasped by the relationship grasping unit.

A third aspect of the invention is a moving object including the control device according to the first aspect or the second aspect.

A fourth aspect of the present invention is a control method of controlling a partition of a moving object, the moving object including: a first seat provided in the moving object; a second seat provided in the moving object; and the partition which is positioned between the first seat and the second seat and is openable and closable, the control method including: a moving state determination step of determining whether or not the moving object has transitioned to a predetermined moving state; and a partition control step of automatically opening and closing the partition when it is determined that the moving object has transitioned to the predetermined moving state.

According to the present invention, it is possible to suitably control a partition provided in a passenger cabin of a moving object.

The above and other objects features and advantages of the present invention will become more apparent from the following description when taken in conjunction with the accompanying drawings in which a preferred embodiment of the present invention is shown by way of illustrative example.

DETAILED DESCRIPTION OF THE INVENTION

Embodiment

Figure 1:
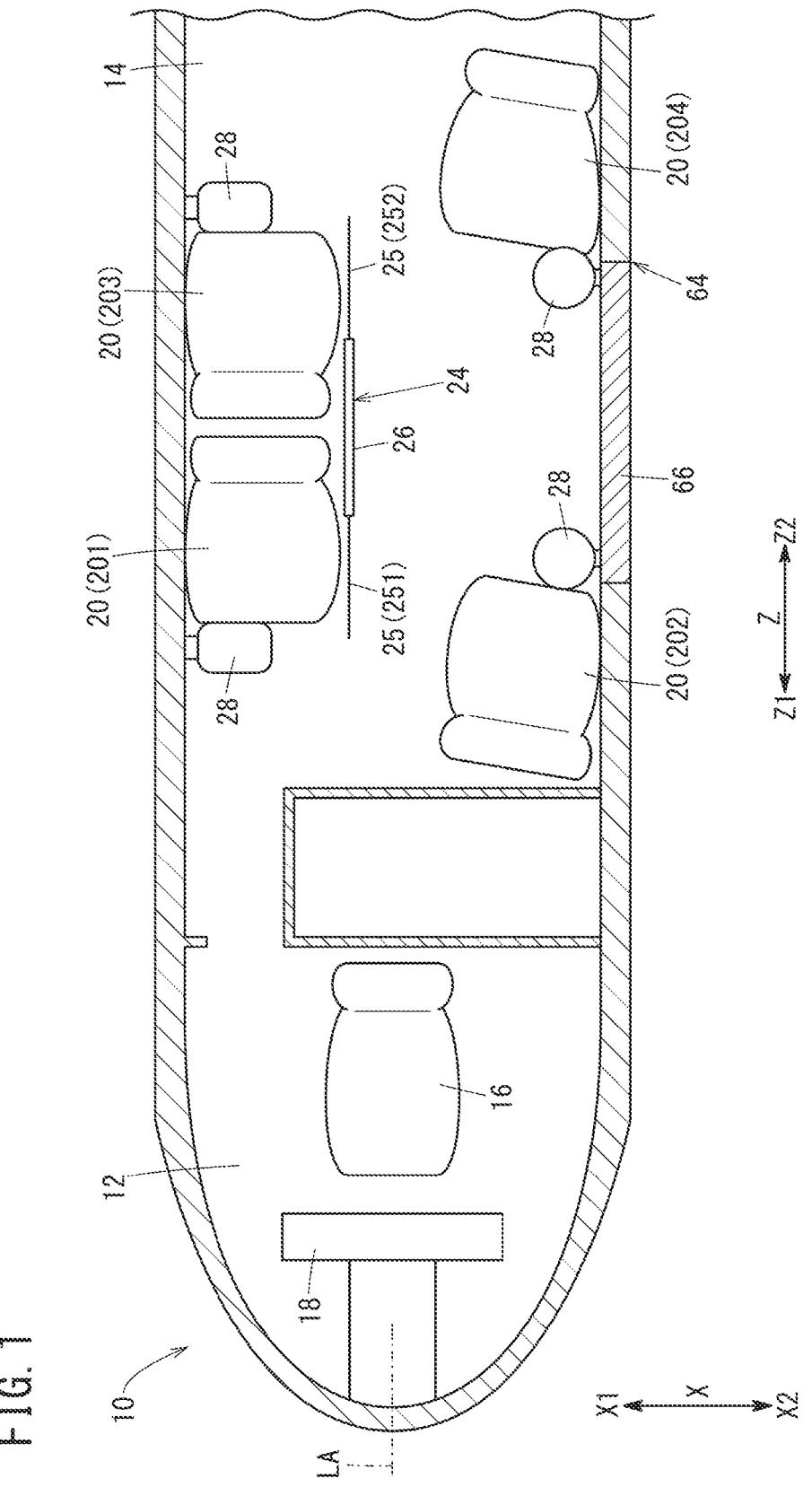
FIG. 1 is a plan view showing the inside of a moving object according to an embodiment.

FIG. 1 is a plan view showing the inside of a moving object 10 according to an embodiment. FIG. 1 shows a front-rear direction Z (Z1, Z2) of the moving object 10 and a widthwise direction X (X1, X2) of the moving object 10.

The moving object 10 is a vehicle that carries passengers. The moving object 10 is, for example, an aircraft such as an eVTOL (electronic Vertical Take-Off and Landing aircraft), but is not limited thereto. The moving object 10 includes a cockpit 12 and a passenger cabin 14.

The cockpit 12 is provided with a pilot's seat 16 and an operation panel 18. A pilot of the moving object 10 sits on the pilot's seat 16. The operation panel 18 is operated by the pilot.

The passenger cabin 14 is used by passengers boarding the moving object 10. The passengers can get on and off the moving object 10 via a doorway (entrance/exit) 64 which is an opening that communicates the inside and outside of the moving object 10. The doorway 64 is provided with a doorway door 66 that is openable and closable.

The passenger cabin 14 is equipped with a plurality of seats 20. The plurality of seats 20 include a first seat 201 located on one side of a shielding device 24 described later and a second seat 202 located on the other side of the shielding device 24. FIG. 1 shows a center line LA of the moving object 10 extending in the front-rear direction Z. In the present embodiment, the first seat 201 is located on one side (X1) in the widthwise direction X with respect to the center line LA, and the second seat 202 is located on the other side (X2) in the widthwise direction X with respect to the center line LA, but the present invention is not limited thereto.

In the following description, a passenger seated in the first seat 201 is also referred to as a first passenger. A passenger seated in the second seat 202 is also referred to as a second passenger.

The moving object 10 further includes an imaging device 22 (see FIG. 4) and the shielding device 24. The shielding device 24 is located between the first seat 201 and the second seat 202 in the widthwise direction X. In the present embodiment, the distance between the shielding device 24 and the first seat 201 in the widthwise direction X is shorter than the distance between the shielding device 24 and the second seat 202 in the widthwise direction X, but the present invention is not limited to this.

The imaging device 22 is, for example, a camera. The imaging device 22 captures images of the inside of the passenger cabin 14. The first seat 201 and the second seat 202 are within the imaging range of the imaging device 22. A plurality of the imaging devices 22 may be provided in the moving object 10. For example, the moving object 10 may include a first imaging device 22 that captures images of the first seat 201 and a second imaging device 22 that captures images of the second seat 202.

Figure 2:
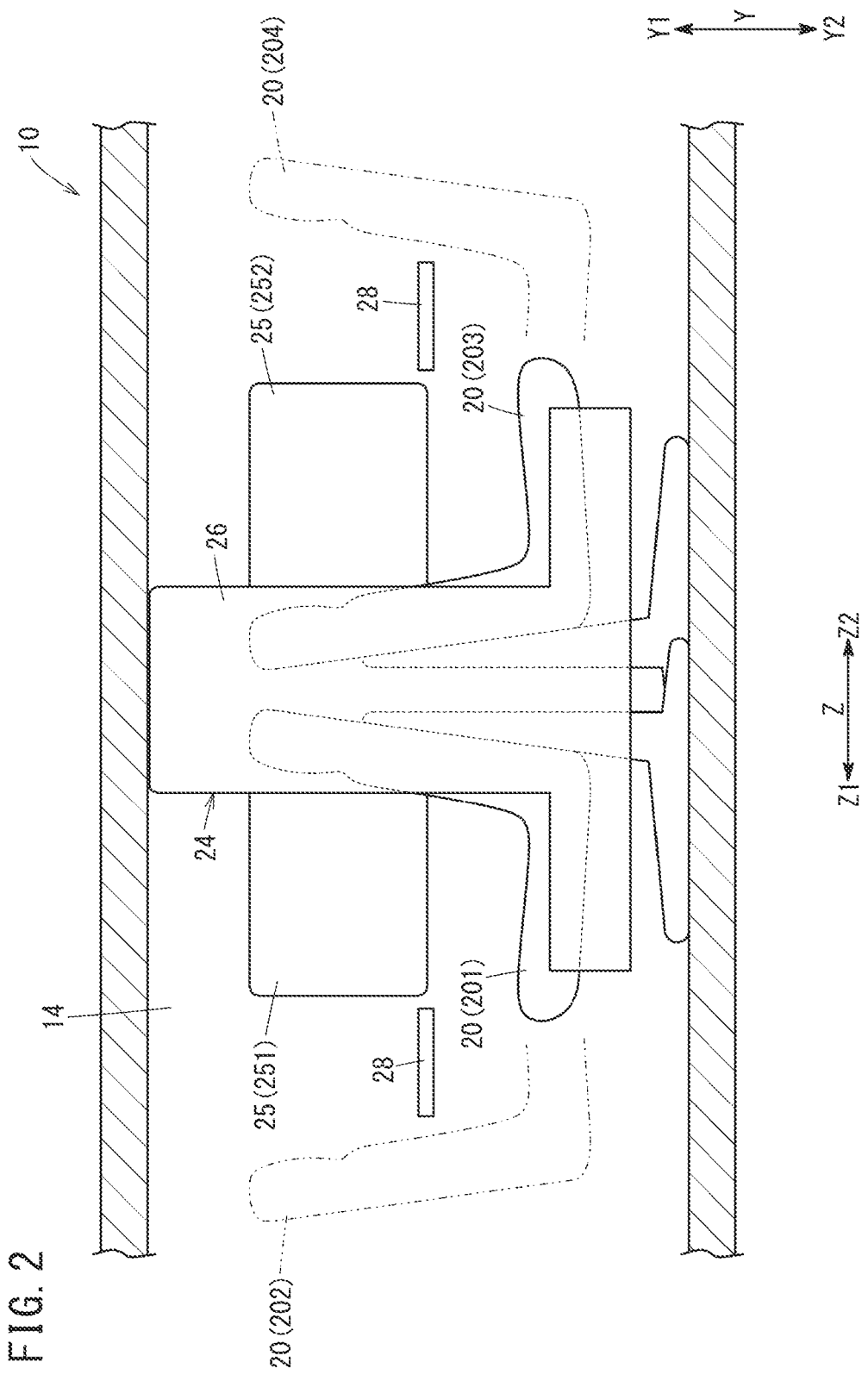
FIG. 2 is a schematic view showing a shielding device.
Figure 3:
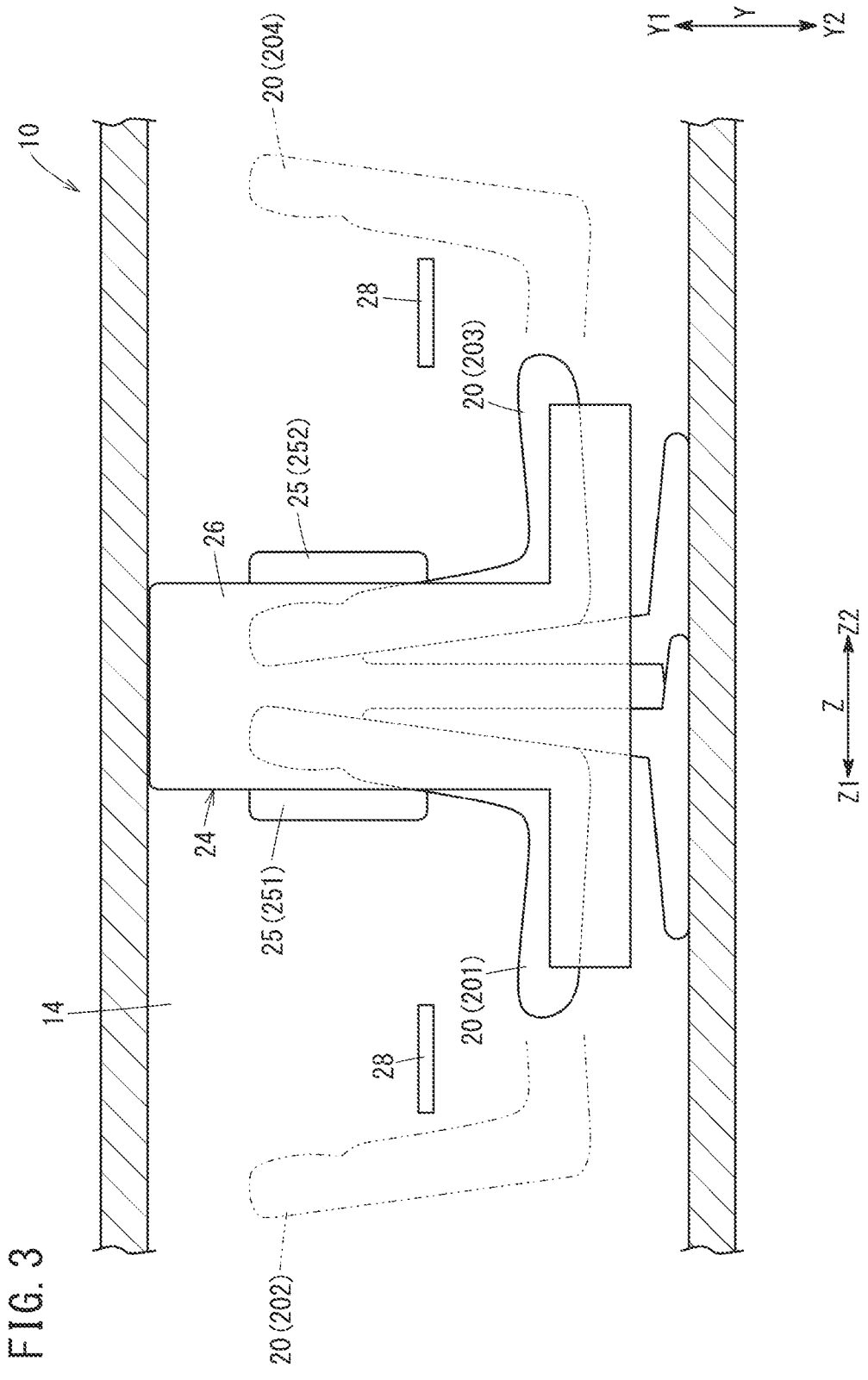
FIG. 3 is a schematic view showing the shielding device.

FIGS. 2 and 3 are schematic views showing the shielding device 24. FIGS. 2 and 3 show an up-down direction Y (Y1, Y2) of the moving object 10.

The shielding device 24 includes a partition 25 (first partition 251) and a main body 26. The first partition 251 is a partition for shielding between the first seat 201 and the second seat 202. The first partition 251 can be retracted (accommodated) in the main body 26. FIG. 2 shows the shielding device 24 in a state where the first partition 251 and a second partition 252 to be described later are projected (deployed). FIG. 3 shows the shielding device 24 with the first partition 251 and the second partition 252 being retracted into the main body 26.

The main body 26 includes a housing capable of accommodating the first partition 251 and an actuator (not shown). The actuator projects the first partition 251. That is, the first partition 251 retracted (accommodated) in the main body 26 moves in the front direction Z1 in response to the driving of the actuator. Thus, as shown in FIG. 2, the first partition 251 shields between the first seat 201 and the second seat 202. The projected first partition 251 can be retracted in the main body 26 again by moving in the rearward direction Z2 in response to the driving of the actuator. The main body 26 may include an operation unit for a passenger to optionally operate the shielding device 24 (a control device 34 to be described later). Although not shown in the drawings, the operation unit includes, for example, one or more switches. As shown in FIG. 1, the main body 26 has a surface that faces in the X1 direction. The operation unit may be provided on the surface. In this case, the first passenger can optionally operate the shielding device 24 while remaining seated on the first seat 201. This provides convenience for the first passenger. For example, the first passenger can optionally restrict execution of at least part of a control method (FIG. 5) described later by operating the operation unit. The position of the operation unit is not limited to the surface of the main body 26 that faces in the X1 direction. For example, the operation unit may be provided on the surface of the main body 26 that faces in the X2 direction.

The shielding device 24 further includes a second partition 252 (25). The second partition 252 is also projected by an actuator (not shown) provided in the main body 26. That is, the second partition 252 retracted (accommodated) in the main body 26 moves in the rearward direction Z2 in response to the driving of the actuator. Thus, as shown in FIG. 2, the second partition 252 shields between a third seat 203 and a fourth seat 204. The projected second partition 252 can be retracted in the main body 26 again by moving in the front direction Z1 in response to the driving of the actuator. The third seat 203 is a rearward-facing seat 20 positioned rearward of the first seat 201. The fourth seat 204 is a forward-facing seat 20 located rearward of the second seat 202.

The actuator provided in the main body 26 includes, for example, a motor, but is not limited thereto. The actuator can be controlled by the control device 34 described later. A first actuator for moving the first partition 251 and a second actuator for moving the second partition 252 may be provided in the main body 26.

The passenger cabin 14 may further be provided with equipment for use by passengers. The equipment is, for example, a table 28 used by passengers.

Figure 4:
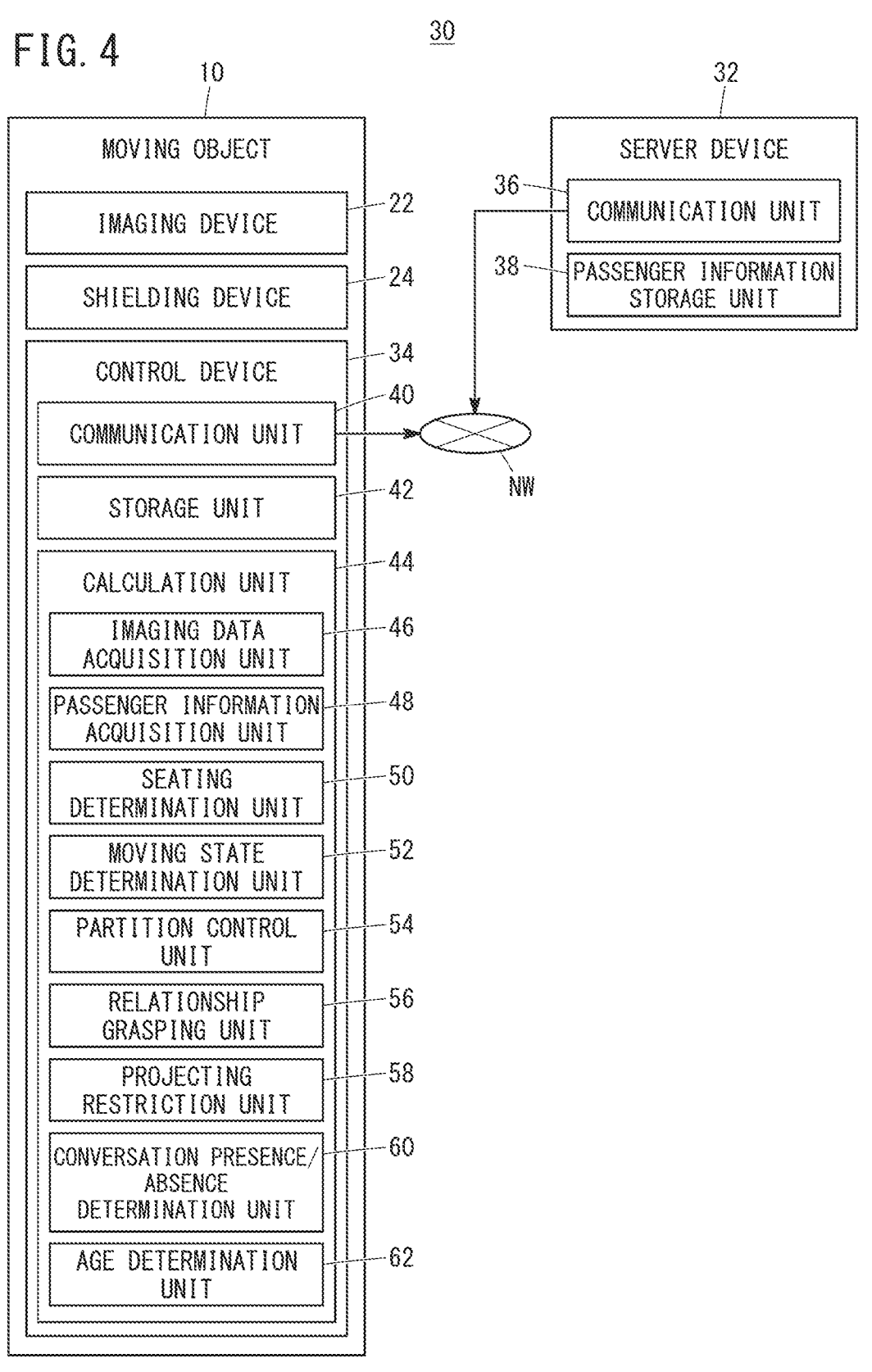
FIG. 4 is a block diagram of a control system according to an embodiment.

FIG. 4 is a block diagram of a control system 30 according to the present embodiment.

The control system 30 is a system (partition control system) that controls the shielding device 24. The control system 30 includes the imaging device 22, the shielding device 24, a server device 32, and the control device 34. As described above, the imaging device 22 and the shielding device 24 are provided in the moving object 10.

The server device 32 is a computer included in a reservation system for making a reservation for the moving object 10. The server device 32 includes a communication unit 36 and a passenger information storage unit 38.

The communication unit 36 includes a communication module (not illustrated). The communication unit 36 is connected to a network NW. The network NW is, for example, the Internet.

The passenger information storage unit 38 can be realized by a memory such as a volatile memory or a nonvolatile memory. The passenger information storage unit 38 may be configured by a hard disk drive (HDD), a solid state drive (SSD), or the like. The passenger information storage unit 38 stores, for example, first passenger information and second passenger information.

The first passenger information is information about the first passenger. The first passenger information includes, for example, information indicating the name of the first passenger, information indicating the age of the first passenger, and the like. The first passenger information is given to the server device 32 via the reservation system that makes a reservation for the use of the moving object 10, for example, when the first seat 201 is reserved via the reservation system.

The second passenger information is information about the second passenger. The second passenger information includes, for example, information indicating the name of the second passenger, information indicating the age of the second passenger, and the like. The second passenger information is given to the server device 32 via the reservation system when the second seat 202 is reserved via the reservation system described above, for example.

The control device (partition control device) 34 is a computer that controls the shielding device 24. More specifically, the control device 34 is a computer that controls the actuator (not shown) provided in the shielding device 24. The control device 34 can be provided in the moving object 10.

When a plurality of the partitions 25 are provided in the moving object 10, the control device 34 may individually control the plurality of partitions 25. Note that, although the control of the first partition 251 which is projected between the first seat 201 and the second seat 202 will be mainly described below, the second partition 252 which is projected between the third seat 203 and the fourth seat 204 can be controlled in the same manner.

The control device 34 includes a communication unit 40, a storage unit 42, and a calculation unit 44.

The communication unit 40 includes a communication module (not illustrated). The communication unit 40 is connected to the network NW. Thus, the control device 34 can communicate with the server device 32 via the network NW.

The storage unit 42 may include a volatile memory (not shown) and a nonvolatile memory (not shown). Examples of the volatile memory may include, for example, a random access memory (RAM). Examples of the non-volatile memory may include, for example, a read only memory (ROM) and a flash memory. Data or the like can be stored, for example, in the volatile memory. Programs, tables, maps, etc. may be stored in the nonvolatile memory, for example.

The calculation unit 44 may be configured by a processor such as a central processing unit (CPU) or a graphics processing unit (GPU). That is, the calculation unit 44 may be configured by processing circuitry.

The calculation unit 44 includes an imaging data acquisition unit 46, a passenger information acquisition unit 48, a seating determination unit 50, a moving state determination unit 52, a partition control unit 54, a relationship grasping unit 56, a projecting (deployment) restriction unit 58, a conversation presence/absence determination unit 60, and an age determination unit 62. The imaging data acquisition unit 46, the passenger information acquisition unit 48, the seating determination unit 50, the moving state determination unit 52, the partition control unit 54, the relationship grasping unit 56, the projecting restriction unit 58, the conversation presence/absence determination unit 60, and the age determination unit 62 can be realized by the calculation unit 44 executing the program stored in the storage unit 42.

At least a part of the imaging data acquisition unit 46, the passenger information acquisition unit 48, the seating determination unit 50, the moving state determination unit 52, the partition control unit 54, the relationship grasping unit 56, the projecting restriction unit 58, the conversation presence/absence determination unit 60, and the age determination unit 62 may be realized by an integrated circuit such as an application specific integrated circuit (ASIC) or a field-programmable gate array (FPGA). At least a part of the imaging data acquisition unit 46, the passenger information acquisition unit 48, the seating determination unit 50, the moving state determination unit 52, the partition control unit 54, the relationship grasping unit 56, the projecting restriction unit 58, the conversation presence/absence determination unit 60, and the age determination unit 62 may be configured by an electronic circuit including a discrete device.

The imaging data acquisition unit 46 acquires imaging data from the imaging device 22. The acquired imaging data is stored in the storage unit 42.

The passenger information acquisition unit 48 acquires the first passenger information and the second passenger information from the passenger information storage unit 38. The passenger information acquisition unit 48 can acquire the first passenger information and the second passenger information via the network NW. The acquired first passenger information and the acquired second passenger information are stored in the storage unit 42.

The seating determination unit 50 determines whether or not at least one of the first seat 201 or the second seat 202 is vacant. In other words, the seating determination unit 50 determines whether or not the first passenger is seated on the first seat 201 and the second passenger is seated on the second seat 202. The seating determination unit 50 can determine whether or not the first passenger is seated on the first seat 201 and the second passenger is seated on the second seat 202, for example, based on the imaging data acquired by the imaging data acquisition unit 46.

A sensor such as a weight sensor may be attached to the first seat 201, and whether or not the first passenger is seated on the first seat 201 may be determined using the sensor. More specifically, the seating determination unit 50 may determine that the first passenger is seated on the first seat 201, for example, when the weight sensor detects the first passenger seated on the first seat 201. In addition, similarly to this, a sensor such as a weight sensor may be attached to the second seat 202, and it may be determined whether or not the second passenger is seated on the second seat 202 using the sensor.

The moving state determination unit 52 determines whether or not the moving object 10 has transitioned to a predetermined moving state. More specifically, the moving state determination unit 52 determines whether the moving object 10 has transitioned to the predetermined moving state or not, when the first passenger is seated on the first seat 201 and the second passenger is seated on the second seat 202. The predetermined moving state is, for example, a cruising state. Whether or not the moving object 10 has transitioned to the cruising state can be determined based on, for example, whether or not the moving speed of the moving object 10 has reached a predetermined cruising speed, but is not limited thereto.

The partition control unit 54 automatically projects the first partition 251 when the moving object 10 has transitioned to the predetermined moving state. For example, when the moving object 10 has not started moving, the first seat 201 and the second seat 202 are not shielded from each other (FIG. 3). When the moving object 10 starts moving and transitions to the cruising state, the partition control unit 54 controls the shielding device 24. Accordingly, the first partition 251 is projected (FIG. 2). The private space for the first passenger and the private space for the second passenger are automatically formed by the first partition 251 being projected.

Note that, when at least one of the first seat 201 or the second seat 202 is vacant, the first partition 251 does not need to be projected. According to the present embodiment, as described above, when the first passenger is seated on the first seat 201 and the second passenger is seated on the second seat 202, it is determined whether or not the moving object 10 has transitioned to the predetermined moving state. In other words, the moving state determination unit 52 does not determine whether the moving object 10 has transitioned to the predetermined moving state or not, when at least one of the first seat 201 or the second seat 202 is vacant. When it is not determined whether or not the moving object 10 has transitioned to the predetermined moving state, the partition control unit 54 does not automatically project the first partition 251. Thus, the first partition 251 is prevented from being projected unmeaningfully.

The relationship grasping unit 56 grasps the relationship between the first passenger seated on the first seat 201 and the second passenger seated on the second seat 202. For example, the relationship grasping unit 56 determines whether or not the first passenger and the second passenger belong to the same organization (company or the like), based on the first passenger information and the second passenger information acquired by the passenger information acquisition unit 48. When the first passenger and the second passenger belong to the same organization, the relationship grasping unit 56 can determine that the first passenger and the second passenger have an acquaintance relationship.

The projecting restriction unit 58 restricts the projecting of the first partition 251 performed by the partition control unit 54, based on the relationship grasped by the relationship grasping unit 56. More specifically, the projecting restriction unit 58 restricts the projecting of the first partition 251 when it is recognized that the first passenger and the second passenger have an acquaintance relationship. When the projecting of the first partition 251 is restricted by the projecting restriction unit 58, the partition control unit 54 does not project the first partition 251 even when the moving object 10 transitions to the predetermined moving state.

When the first passenger and the second passenger are in an acquaintance relationship, the first passenger and the second passenger are highly likely to have a conversation while travelling on the moving object 10. If the first partition 251 is projected between the first passenger and the second passenger who have an acquaintance relationship, the conversation between the first passenger and the second passenger may be hindered by the first partition 251.

Therefore, in the present embodiment, as described above, when the first passenger and the second passenger have an acquaintance relationship, the projecting of the first partition 251 is restricted. In this way, it is possible to prevent the conversation between the first passenger and the second passenger from being hindered by the shielding device 24.

The conversation presence/absence determination unit 60 determines whether or not a state in which the first passenger and the second passenger do not converse with each other has continued for a predetermined time or more. The conversation presence/absence determination unit 60 determines whether or not the first passenger and the second passenger are having a conversation, for example, based on the imaging data acquired by the imaging data acquisition unit 46. When the first passenger and the second passenger are not conversing, the conversation presence/absence determination unit 60 further determines whether or not the state in which the first passenger and the second passenger are not conversing has continued for a predetermined time or more. The conversation presence/absence determination unit 60 can determine whether or not a state in which the first passenger and the second passenger do not have a conversation continues for a predetermined time or more after the moving object 10 has transitioned to the predetermined moving state (cruising state), for example, but is not limited thereto. Incidentally, a sound sensor such as a microphone may be provided in the passenger cabin 14. In this case, the conversation presence/absence determination unit 60 may determine whether or not a state in which the first passenger and the second passenger do not have a conversation has continued for a predetermined time or more, based on the detection signal of the sound sensor.

The projecting restriction unit 58 described above allows the partition control unit 54 to project the first partition 251 when the state in which the first passenger and the second passenger do not converse with each other has continued for a predetermined time or more.

Thus, even when the first passenger and the second passenger are in an acquaintance relationship, the first partition 251 is projected between the first passenger and the second passenger.

For example, there are cases where at least one of the first passenger or the second passenger may have a nap without having a conversation. In such cases, even when the first passenger and the second passenger are in an acquaintance relationship, it is preferable to form a private space by the first partition 251. Thus, it is possible to provide a relaxing environment for the first passenger and the second passenger.

In addition, there are cases where at least one of the first passenger or the second passenger may work using a personal computer, a smartphone, or the like without having a conversation. In such cases, even when the first passenger and the second passenger are in an acquaintance relationship, it is preferable to form a private space by the first partition 251. Thus, it is possible to provide an environment in which the first passenger and the second passenger can easily concentrate on the work.

The relationship grasping unit 56 described above may grasp the relationship between the first passenger and the second passenger using the result of a determination by the conversation presence/absence determination unit 60. That is, as described above, the conversation presence/absence determination unit 60 can determine whether or not the first passenger and the second passenger are having a conversation, based on the imaging data. When it is grasped that the first passenger and the second passenger are talking with each other, based on the imaging data, the relationship grasping unit 56 may determine that the first passenger and the second passenger are in an acquaintance relationship.

The age determination unit 62 determines whether or not at least one of the age of the first passenger or the age of the second passenger is equal to or less than a predetermined age threshold value. The age of the first passenger is identified, for example, on the basis of the first passenger information. The age of the second passenger is identified, for example, on the basis of the second passenger information. The age determination unit 62 determines whether or not at least one of the first passenger or the second passenger is underage, for example, but is not limited thereto.

The projecting restriction unit 58 described above restricts the projecting of the first partition 251 performed by the partition control unit 54, when at least one of the age of the first passenger or the age of the second passenger is equal to or less than a predetermined age threshold.

Thus, when at least one of the age of the first passenger or the age of the second passenger is equal to or less than the predetermined age threshold, the first partition 251 is not automatically projected. In this way, for example, when at least one of the first passenger or the second passenger is a child, the child can be easily watched by his/her guardian.

Figure 5:
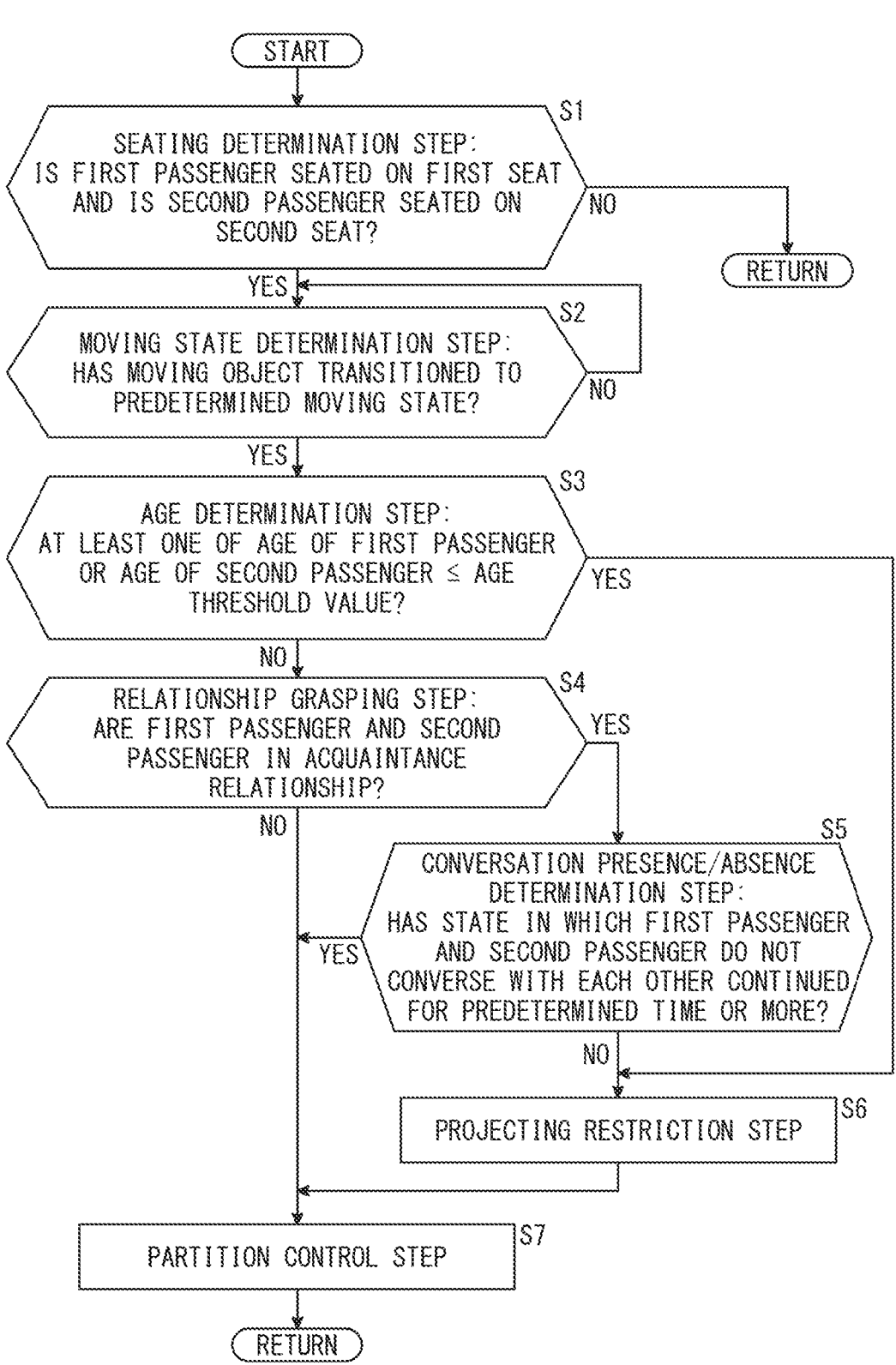
FIG. 5 is a flowchart illustrating a method of controlling partitions.

FIG. 5 is a flowchart showing a method of controlling the partition 25. The control method can be realized by the calculation unit 44 executing a program stored in the storage unit 42.

The method of controlling the partition 25 according to the present embodiment includes a seating determination step S1, a moving state determination step S2, an age determination step S3, a relationship grasping step S4, a conversation presence/absence determination step S5, a projecting (deployment) restriction step S6, and a partition control step S7. At the stage when the method of controlling the partition 25 is started (START), the first partition 251 is not projected (deployed). That is, at the stage when the control method of the first partition 251 is started, the shielding device 24 is in a state shown in FIG. 3.

In the seating determination step S1, the seating determination unit 50 determines whether or not the first passenger is seated on the first seat 201 and the second passenger is seated on the second seat 202.

When the first passenger is seated on the first seat 201 and the second passenger is seated on the second seat 202, the moving state determination step S2 is started. When at least one of the first seat 201 or the second seat 202 is vacant, the moving state determination step S2 and the subsequent steps are not required to be executed, and thus the control method of FIG. 5 is terminated.

In the moving state determination step S2, the moving state determination unit 52 determines whether or not the moving object 10 has transitioned to a predetermined moving state. As described above, the predetermined moving state is, for example, a cruising state.

When the moving object 10 has transitioned to the predetermined moving state, the age determination step S3 is started. When the moving object 10 has not transitioned to the predetermined moving state, the moving state determination step S2 is repeated until the moving object 10 transitions to the predetermined moving state.

In the age determination step S3, the age determination unit 62 determines whether or not at least one of the age of the first passenger or the age of the second passenger is equal to or less than the age threshold value (at least one of the age of the first passenger or the age of the second passenger≤the age threshold value).

If at least one of the age of the first passenger or the age of the second passenger is equal to or less than the age threshold value, the projecting restriction step S6 is started. If both the ages of the first passenger and of the second passenger are greater than the age threshold value, the relationship grasping step S4 is initiated.

In the relationship grasping step S4, the relationship grasping unit 56 grasps the relationship between the first passenger and the second passenger. When the first passenger and the second passenger are in an acquaintance relationship, the conversation presence/absence determination step S5 is started. When the first passenger and the second passenger are not in an acquaintance relationship, the partition control step S7 is started.

In the conversation presence/absence determination step S5, the conversation presence/absence determination unit 60 determines whether or not a state in which the first passenger and the second passenger do not converse with each other has continued for a predetermined time or more.

When the state in which the first passenger and the second passenger do not converse with each other has continued for the predetermined time or more, the partition control step S7 is started. When the state in which the first passenger and the second passenger do not converse with each other does not continue for the predetermined time or more, the projecting restriction step S6 is started.

In the projecting restriction step S6, the projecting restriction unit 58 restricts the projecting of the shielding device 24. For example, the projecting restriction unit 58 instructs the partition control unit 54 not to automatically project the shielding device 24 in the partition control step S7 described later. After the completion of the projecting restriction step S6, the partition control step S7 is started.

In the partition control step S7, the partition control unit 54 automatically controls the shielding device 24. When the projecting restriction step S6 is not executed, the partition control unit 54 automatically projects the shielding device 24.

When the projecting restriction step S6 is executed, the partition control unit 54 does not automatically project the shielding device 24. When the partition control step S7 is completed, the control method shown in FIG. 5 is ended (RETURN).

APPENDIX

With respect to the above disclosure, the following appendixes are further disclosed.

Appendix 1

The control device (34) according to the present disclosure controls the partition of the moving object (10) including the first seat (201) provided in the moving object, the second seat (202) provided in the moving object, and the partition (25) which is positioned between the first seat and the second seat and is projectable. The control device (34) includes: the moving state determination unit (52) configured to determine whether or not the moving object has transitioned to the predetermined moving state; and the partition control unit (54) configured to automatically project the partition when the moving state determination unit determines that the moving object has transitioned to the predetermined moving state. Thus, the partition provided in the moving object can be suitably controlled.

Appendix 2

In the control device according to Appendix 1, the predetermined moving state may be the cruising state. Thus, when the moving object transitions to the cruising state, the partition can be automatically projected.

Appendix 3

The control device according to Appendix 1 or 2 may further include the relationship grasping unit (56) configured to grasp the relationship between the first passenger seated on the first seat and the second passenger seated on the second seat, and the projecting restriction unit (58) configured to restrict projecting of the partition performed by the partition control unit, based on the relationship grasped by the relationship grasping unit. Thus, when the passengers are in an acquaintance relationship, the projecting of the partition is restricted.

Appendix 4

In the control device according to Appendix 3, the first passenger information related to the first passenger and the second passenger information related to the second passenger may be stored in advance in the passenger information storage unit (38), and the relationship grasping unit may grasp the relationship based on the first passenger information and the second passenger information acquired from the passenger information storage unit.

Appendix 5

In the control device according to Appendix 3 or 4, the imaging device (22) that captures an image of the inside of the moving object may be provided in the moving object, and the relationship grasping unit may grasp the relationship, on the basis of data of the image captured by the imaging device.

Appendix 6

The control device according to any one of Appendixes 3 to 5 may further include the conversation presence/absence determination unit (60) configured to determine whether or not a state in which the first passenger and the second passenger do not converse with each other has continued for the predetermined time or more, and the projecting restriction unit may allow the projecting of the partition performed by the partition control unit when the conversation presence/ absence determination unit determines that the state in which the first passenger and the second passenger do not converse with each other has continued for the predetermined time or more. Thus, even when the passengers are in an acquaintance relationship, the partition is projected when the passengers do not have a conversation.

Appendix 7

In the control device according to any one of Appendixes 3 to 6, the projecting restriction unit may restrict the projecting of the partition performed by the partition control unit when at least one of the age of the first passenger seated on the first seat or the age of the second passenger seated on the second seat is equal to or less than the predetermined age threshold value. This makes it easy for an adult around a child to watch the child, for example.

Appendix 8

In the control device according to any one of Appendixes 1 to 7, the partition control unit may not automatically project the partition when at least one of the first seat or the second seat is vacant. Thus, the partition is prevented from being projected wastefully.

Appendix 9

The control device (34) according to the present disclosure controls the partition (25) of the moving object (10) including the first seat (201) provided in the moving object, the second seat (202) provided in the moving object, and the partition positioned between the first seat and the second seat and which is openable and closable. The control device (34) includes the relationship grasping unit (56) configured to grasp the relationship between the first passenger seated on the first seat and the second passenger seated on the second seat, and the partition control unit (54) configured to automatically control the partition based on the relationship grasped by the relationship grasping unit. Thus, the partition provided in the moving object can be suitably controlled.

Appendix 10

The moving object (10) according to the present disclosure includes the control device according to any one of Appendixes 1 to 9. The control device can suitably control the partition provided in the moving object.

Appendix 11

The control method according to the present disclosure is the control method for controlling the partition (25) of the moving object (10) including the first seat (201) provided in the moving object, the second seat (202) provided in the moving object, and the partition positioned between the first seat and the second seat and which is openable and closable. The control method includes a moving state determination step (S2) of determining whether or not the moving object has transitioned to the predetermined moving state and a partition control step (S7) of automatically opening and closing the partition, which is executed when the moving object has transitioned to the predetermined moving state. Thus, the partition provided in the moving object can be suitably controlled.

Moreover, it should be noted that the present invention is not limited to the disclosure described above, but various configurations may be adopted therein without departing from the essence and gist of the present invention.

The invention claimed is:

1. A control device for controlling a partition of a moving object, the moving object including: a first seat provided in the moving object; a second seat provided in the moving object; and the partition which is positioned between the first seat and the second seat and is projectable, the control device comprising:

one or more processors that execute computer-executable instructions stored in a memory, wherein the one or more processors execute the computer-executable instructions to cause the control device to:

determine whether or not the moving object has transitioned to a predetermined moving state; and automatically project the partition when it is determined that the moving object has transitioned to the predetermined moving state, wherein the predetermined moving state is a cruising state.

2. The control device according to claim 1, wherein the one or more processors cause the control device not to automatically project the partition when at least one of the first seat or the second seat is vacant.

3. A moving object comprising the control device according to claim 1.

4. A control device for controlling a partition of a moving object, the moving object including: a first seat provided in the moving object; a second seat provided in the moving object; and the partition which is positioned between the first seat and the second seat and is openable and closable, the control device comprising:

one or more processors that execute computer-executable instructions stored in a memory, wherein the one or more processors execute the computer-executable instructions to cause the control device to:

grasp a relationship between a first passenger seated on the first seat and a second passenger seated on the second seat; and automatically control the partition, based on the relationship that has been grasped.

5. A moving object comprising the control device according to claim 4.

6. The control device according to claim 4, wherein the one or more processors cause the control device to restrict projecting of the partition, based on the relationship that has been grasped.

7. The control device according to claim 4, wherein first passenger information related to the first passenger and second passenger information related to the second passenger are stored in advance in a server device, and the one or more processors cause the control device to grasp the relationship, based on the first passenger information and the second passenger information acquired from the server device.

8. The control device according to claim 4, further comprising an imaging device configured to capture an image of an inside of the moving object is provided in the moving object, wherein the one or more processors cause the control device to grasp the relationship, based on data of the image captured by the imaging device.

9. The control device according to claim 4, wherein the one or more processors cause the control device to:

determine whether or not a state in which the first passenger and the second passenger do not converse with each other has continued for a predetermined time or more; and allow the projecting of the partition when it is determined that the state in which the first passenger and the second passenger do not converse with each other has continued for the predetermined time or more.

10. The control device according to claim 4, wherein the one or more processors cause the control device to restrict the projecting of the partition when at least one of an age of the first passenger seated on the first seat or an age of the second passenger seated on the second seat is equal to or less than a predetermined age threshold value.

11. The control device according to claim 4, wherein the one or more processors cause the control device not to automatically project the partition when at least one of the first seat or the second seat is vacant.

12. A control method of controlling a partition of a moving object, the moving object including:

a first seat provided in the moving object;

a second seat provided in the moving object; and the partition which is positioned between the first seat and the second seat and is openable and closable, the control method comprising:

determining whether or not the moving object has transitioned to a cruising state; and automatically opening and closing the partition when it is determined that the moving object has transitioned to the cruising state.

* * * * *